(12) United States Patent
Selkirk et al.

(10) Patent No.: US 6,978,356 B2
(45) Date of Patent: Dec. 20, 2005

(54) SYSTEM TO SUPPORT DYNAMICALLY FLEXIBLE DATA DEFINITIONS AND STORAGE REQUIREMENTS

(75) Inventors: Stephen S. Selkirk, Broomfield, CO (US); Charles A. Milligan, Golden, CO (US)

(73) Assignee: Storage Technology Corporation, Louisville, CO (US)

( * ) Notice: Subject to any disclaimer, the term of this patent is extended or adjusted under 35 U.S.C. 154(b) by 420 days.

(21) Appl. No.: 09/751,635

(22) Filed: Dec. 29, 2000

(65) Prior Publication Data

US 2002/0087787 A1    Jul. 4, 2002

Related U.S. Application Data

(60) Provisional application No. 60/212,284, filed on Jun. 19, 2000.

(51) Int. Cl.$^7$ ............................................. G06F 12/08
(52) U.S. Cl. ...................... 711/203; 711/114; 711/154
(58) Field of Search ........................ 711/154, 114, 202

(56) References Cited

U.S. PATENT DOCUMENTS

| | | | |
|---|---|---|---|
| 5,392,244 A * | 2/1995 | Jacobson et al. | 711/114 |
| 5,651,133 A * | 7/1997 | Burkes et al. | 711/114 |
| 5,960,451 A | 9/1999 | Voigt et al. | 711/114 |
| 6,038,639 A * | 3/2000 | O'Brien et al. | 711/114 |
| 6,230,240 B1 | 5/2001 | Shrader et al. | 711/114 |
| 6,397,293 B2 | 5/2002 | Shrader et al. | 711/114 |
| 6,438,648 B1 * | 8/2002 | McKean et al. | 711/114 |
| 6,487,562 B1 * | 11/2002 | Mason et al. | 707/205 |
| 6,526,478 B1 * | 2/2003 | Kirby | 711/114 |
| 6,640,278 B1 * | 10/2003 | Nolan et al. | 711/6 |
| 6,681,310 B1 * | 1/2004 | Kusters et al. | 711/202 |
| 6,687,805 B1 * | 2/2004 | Cochran | 711/209 |
| 2002/0032908 A1 * | 3/2002 | Booth | 725/86 |

* cited by examiner

*Primary Examiner*—Jack Lane
(74) *Attorney, Agent, or Firm*—Yee & Associates, P.C.

(57) ABSTRACT

A system is provided to support dynamically flexible data definitions and storage requirements in a data processing system. The present invention separates processing of data unit requirements from the selection of which storage subsystems to use for storage by using a storage methodologies inventory. The present invention provides a system to support dynamically flexible data definitions and storage requirements in a data processing system. A virtual stored data management subsystem contains one or more hosts. A plurality of virtual data units are functionally coupled to the one or more hosts. The plurality of virtual data units includes associated management information such that the management information provides first and second boundaries. The first and second boundaries limit preferences in which to store the virtual data units with the stored data management subsystem.

9 Claims, 6 Drawing Sheets

SYSTEM TO SUPPORT DYNAMICALLY FLEXIBLE DATA DEFINITIONS AND STORAGE REQUIREMENTS

CROSS REFERENCE TO RELATED APPLICATIONS

This application claims the benefit of the filing date of corresponding U.S. Provisional Patent Application No. 60/212,284, entitled "System for providing a policy-based demand and use of functions like virtual volumes, instant copy, RAID, etc.", filed Jun. 19, 2000. In addition, the present invention is related to applications entitled EFFECTING INSTANT COPIES IN A DYNAMICALLY MAPPED SYSTEM, Ser. No. 09/884,294, USING CURRENT RECOVERY MECHANISMS TO IMPLEMENT DYNAMIC MAPPING OPERATIONS, Ser. No. 09/800,714, DYNAMICALLY CHANGEABLE VIRTUAL MAPPING SCHEME, Ser. No. 09/751,772, RECOVERY OF DYNAMIC MAPS AND DATA MANAGED THEREBY; Ser. No. 09/752,253, FLOATING VIRTUALIZATION LAYERS, Ser. No. 09/752,071, and SELF DEFINING DATA UNITS, Ser. No. 09/751,641, which is filed even date hereof, assigned to the same assignee, and incorporated herein by referenced.

BACKGROUND OF THE INVENTION

1. Technical Field

The present invention relates generally to an improved data processing system and in particular to a data storage subsystem for use with a data processing system. Still more particularly, the present invention provides a system to support dynamically flexible data definitions and storage requirements in a data processing system.

2. Description of Related Art

In computer systems and data storage subsystems, one problem is performing a data file copy operation in a manner that minimizes the use of processing resources and data storage memory. Previously, data files were copied in their entirety by the processor, such that two exact copies of the selected data file were resident in the data storage memory. This operation consumed twice the amount of memory for the storage of two identical copies of the data file. Additionally, this operation required the intervention of the processor to effect the copy of the original data file.

A data file snapshot copy is an improvement over this type of copy process. This snapshot copy process includes a dynamically mapped virtual data storage subsystem. This subsystem stores data files received from a processor in back-end data storage devices by mapping the processor assigned data file identifier to a logical address that identifies the physical storage location of the data. This dynamically mapped virtual data storage subsystem performs a copy of a data file by creating a duplicate data file pointer to a data file identifier in a mapping table to reference the original data file. In this dynamically mapped virtual data storage subsystem, the data files are referred to as a collection of "virtual tracks" and each data file is identified by unique virtual track addresses (VTAs). The use of a mapping table provides the opportunity to replace the process of copying the entirety of a data file in the data storage devices with a process that manipulates the contents of the mapping table. A data file appears to have been copied if the name used to identify the original data file and the name used to identify the copy data file are both mapped to the same physical data storage location.

This mechanism enables the processor to access the data file via two virtual track addresses while only a single physical copy of the data file resides on the back-end data storage devices in the data storage subsystem. This process minimizes the time required to execute the copy operation and the amount of memory used since the copy operation is carried out by creating a new pointer to the original data file and does not require any copying of the data file itself.

One implementation of the snapshop copy process provides a two-table approach. One table has table entries for each virtual device track pointing to another table containing the physical track location for the entry. Each physical track table entry identifies the number of virtual track entries that point to this entry by use of a reference count mechanism. Each virtual track entry that points to the physical track is called a "reference." The reference count increments when a new virtual track table entry pointer points to this physical entry (e.g. snap) and the reference count decrements when a virtual track table entry pointer is removed (e.g. update source after a snap). When a reference count is zero, then that physical track can be deleted from the back-end since it is known that there are no references to the physical track.

System administrators are beginning to realize that "point in time" or "instant" copies of data are extremely useful. However, the system administrator has to specifically plan for and request execution of these copies at the host level, such as setting up mirrored volumes or using the snapshot commands available in virtual mapping subsystems.

In addition, when attempting to provide the benefits of virtualized data storage, some type of mapping scheme is required. One of the problems with some of the existing mapping schemes is the additional processing overhead needed to process the mapping algorithm or following the mapping pointers to find the location of the desired data. Some of the mapping schemes force the manipulation of many pointers in order to perform operations on large sets of mapped data. Some mapping schemes also force the allocation of mapping tables for all possible virtual addresses whether or not those addresses are actually used.

In addition, RAID (redundant array of inexpensive disks) disk subsystems are traditionally organized by a set of disk drives into a RAID group. The RAID group can be viewed as a single logical unit. Furthermore, the capacities of disk drives have been increasing to such a size that operating systems of file systems may not utilize all of the space of a RAID group. In an attempt to resolve this, some RAID products are capable of partitioning a bound drive set into multiple logical units.

In most cases, with RAID products partitioning a bound drive into a set of multiple logical units, the RAID subsystem requires all units to be homogenous. In only a few cases, heterogeneous logical units with similar attributes can be combined in a RAID group. In general, these units need to meet the lowest common denominator of capacity to have a consistent device relative address for RAID stripe allocation.

However, the one exception to this method of associating RAID groups is the HP AutoRAID. The HP AutoRAID has a close analogy to the storage pool invention defined here but is different in concept. In HP AutoRAID, all drives comprise the basis to one of two RAID sets. There is one RAID one and one RAID five set. Drives are partitioned into groups on request. The AutoRAID does not provide a common space capacity. Capacity is managed across all units to satisfy the RAID group requirement.

Therefore, it would advantageous to have a system that provides for a complex utilization of such functions as mirror and snapshot and allows for the definition of unique virtual device structures that are defined by a user on demand.

SUMMARY OF THE INVENTION

The present invention provides a system to support dynamically flexible data definitions and storage requirements in a data processing system. The present invention separates processing of data unit requirements from the selection of which storage subsystems to use for storage by using a storage methodologies inventory. A virtual stored data management subsystem contains one or more hosts. A plurality of virtual data units are functionally coupled to the one or more hosts. The plurality of virtual data units includes associated management information such that the management information provides first and second boundaries. The first and second boundaries limit preferences in which to store the virtual data units with the stored data management subsystem.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
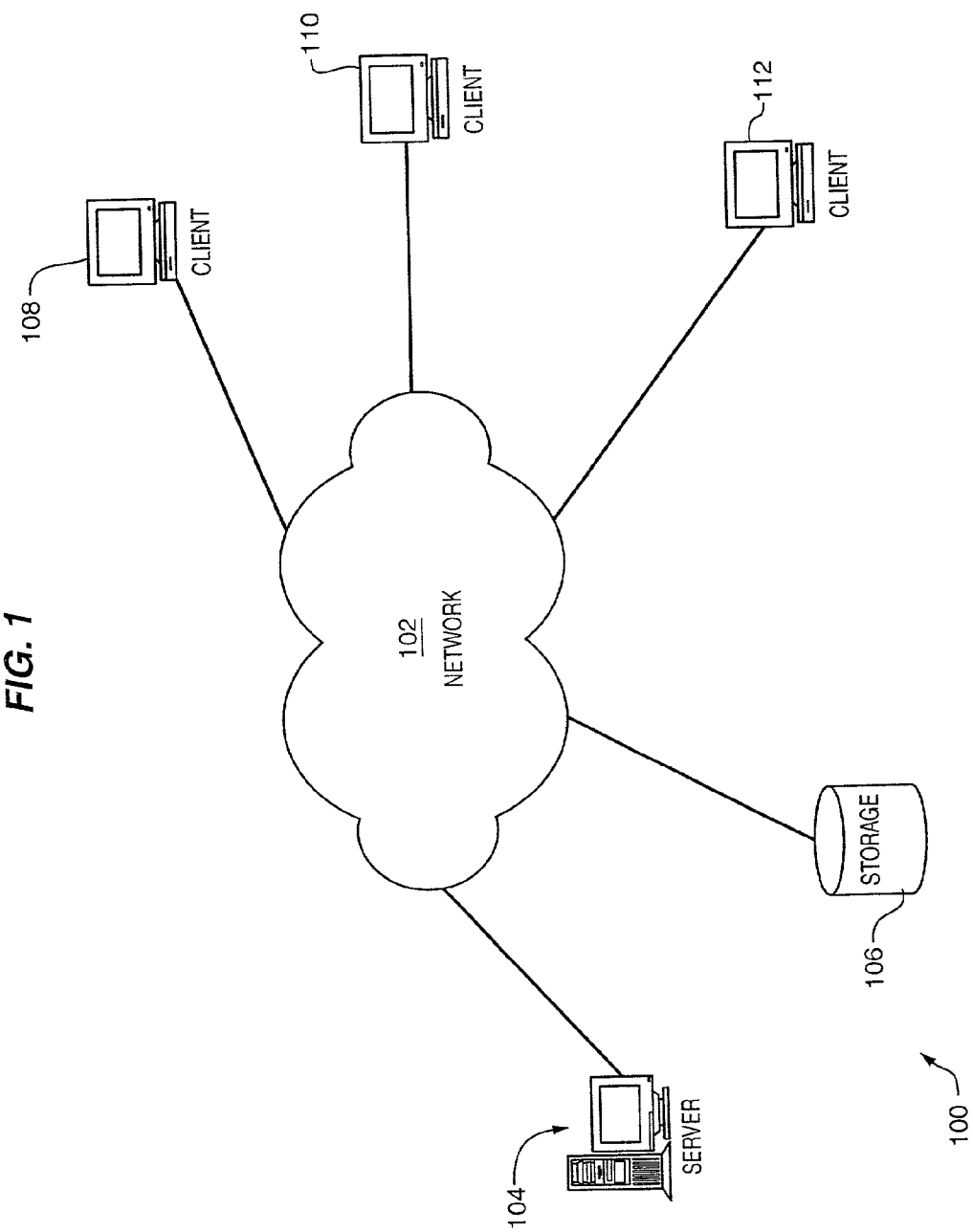
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage subsystem 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. Distributed data processing system 100 may be implemented as one or more of a number of different types of networks, such as, for example, an intranet, a local area network (LAN), or a wide area network (WAN). Network 102 contains various links, such as, for example, fiber optic links, packet switched communication links, enterprise systems connection (ESCON) fibers, small computer system interface (SCSI) cable, wireless communication links. In these examples, storage subsystem 106 may be connected to server 104 using ESCON fibers. FIG. 1 is intended as an example and not as an architectural limitation for the present invention.

Figure 2:
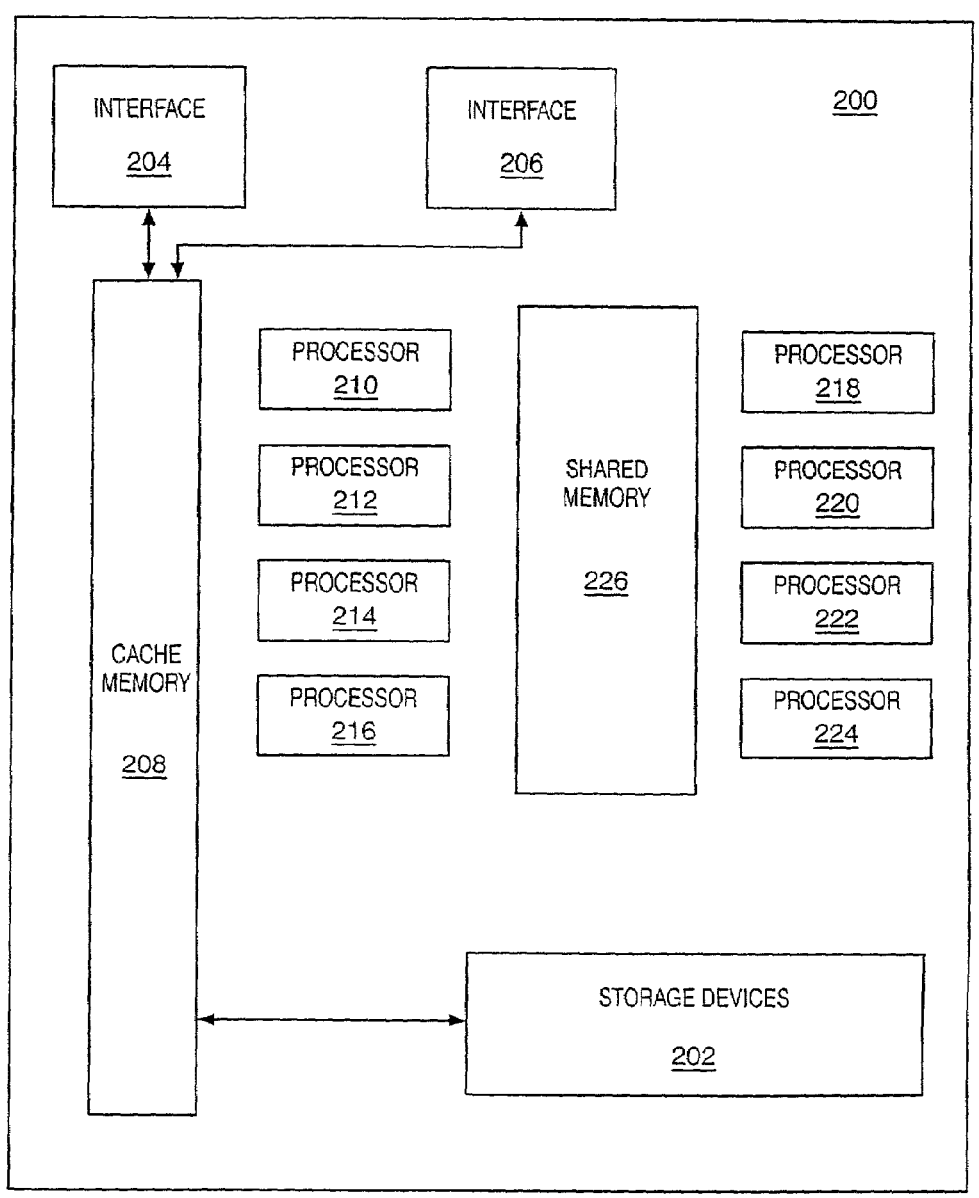
FIG. 2 is a block diagram of a storage subsystem in accordance with a preferred embodiment of the present invention.

Turning next to FIG. 2, a block diagram of a storage subsystem is depicted in accordance with a preferred embodiment of the present invention. Storage subsystem 200 may be used to implement storage subsystem 106 in FIG. 1. As illustrated in FIG. 2, storage subsystem 200 includes storage devices 202, interface 204, interface 206, cache memory 208, processors 210–224, and shared memory 226.

Interfaces 204 and 206 in storage subsystem 200 provide a communication gateway through which communication between a data processing system and storage subsystem 200 may occur. In this example, interfaces 204 and 206 may be implemented using a number of different mechanisms, such as ESCON cards, SCSI cards, fiber channel interfaces, modems, network interfaces, or a network hub. Although the depicted example illustrates the use of two interface units, any number of interface cards may be used depending on the implementation.

In this example, storage subsystem 200 is a shared virtual array. Storage subsystem 200 is a virtual storage system in that each physical storage device in storage subsystem 200 may be represented to a data processing system, such as client 108 in FIG. 1, as a number of virtual devices. In this example, storage devices 202 are a set of disk drives set up as a redundant array of inexpensive disks (RAID) system. Of course, other storage devices may be used other than disk drives. For example, optical drives may be used within storage devices 202. Further, a mixture of different device types may be used, such as, disk drives and tape drives.

Data being transferred between interfaces 204 and 206 and storage devices 202 are temporarily placed into cache memory 208. Additionally, cache memory 208 may be accessed by processors 210–224, which are used to handle reading and writing data for storage devices 202. Shared memory 226 is used by processors 210–224 to handle and track the reading and writing of data to storage devices 202.

The present invention manages virtual storage facilities comprising an organization of computer equipment, for example, a host network, data transfer means, storage controller means, permanent storage means and attachment means connecting these devices together. The data storage facilities also may include management information associated with data units such that the management information provides an inventory of capabilities with upper and lower boundaries that may limit the options available to store the data and still meet a user's criteria. For purposes of this application, a data unit is a logical entity known to a owning entity that is composed of a number of data elements and meta-data and a data element is a grouping of data bits or bytes that the subsystem chooses to manage as a consistent set. Such management information may be independent of attributes of or characteristics of the devices in the physical storage subsystem actually used to store the data elements, but may consist of imputed associations with those attributes through, for example, changeable rule sets, processes or algorithms. These rule sets, processes or algorithms may be changed by user demand or via processes, that may monitor data unit usage and manipulation. The storage of data elements may be adjusted to comply with modifications in the, for example, rules sets, processes or algorithms.

In addition, the present invention may include such management information processing with respect to storage device attributes which may include, for example, empirically derived relationships that may infer boundaries, explicitly stated relationships that may stipulate boundaries, relationships that may exist only on demand and combinations of standard storage subsystem relationships such as, for example, RAID in all its forms and hierarchical storage management (HSM) in all its forms. Also, relation of the management information and the subsystem device attributes may be modified resulting in the storage of the data units having to be adjusted in which such a change of relations between the management information and the subsystem attributes include encapsulated logic. The relation between the management information and the subsystem device attributes may also include attributes of implied storage devices not present in the physical subsystem. The relation between the management information and the subsystem device attributes may also include apparently mutual exclusive sets of criteria, for example, criteria satisfied by multiple instances of data storage and criteria satisfied by storage of data at multiple layers on the storage subsystem. The relation between the management information and the subsystem device attributes may also be conditionally applied, such as, for example, between a specified criteria and a default criteria and between a plurality of specified criteria.

Figure 3:
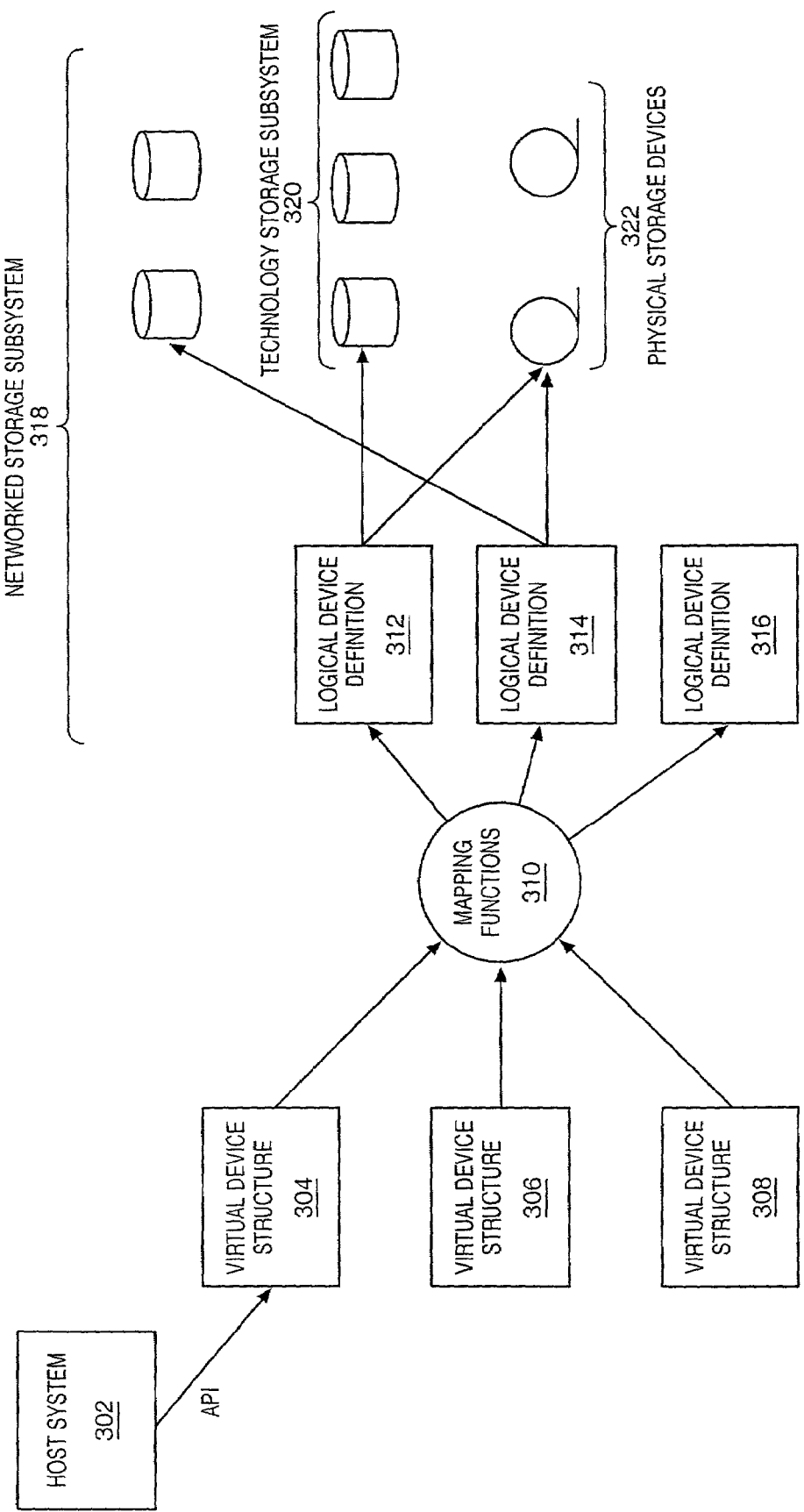
FIG. 3 is an exemplary block diagram of the conceptual relationship between the virtual device structures and the logical device structures in accordance with a preferred embodiment of the present invention.

FIG. 3 is an exemplary block diagram of the conceptual relationship between the virtual device structures and the logical device structures in accordance with a preferred embodiment of the present invention. The present invention provides a subsystem level application program interface (API) 312 from host system 302 which allows a user to construct data unit definitions or virtual devices. These data unit definitions or virtual devices, such as, for example, virtual device structures 304, 306 and 308, may be called "Virtual Device Structures" (VDS). A subsystem in turn will implement logical device structures with mapping functions 310 and mapping VDSs into the physical world managed by the subsystem. The data may be mapped into networked storage subsystem 318 which may consist of logical definitions 312, 314 and 316. Networked storage subsystem 318 may also consist of storage units 324 and 326 in which the data is stored. Also, data may be stored in technology storage subsystem 320 which may be a RAID and in physical storage devices 322. VDSs may be defined by requesting the use of performance structures like striping, redundancy structures like mirroring and demand copies, and location structures like remote location of copies or archive copies, either alone or in combination. These VDSs also may have scheduling and synchronizing information that allow complete policies to be defined within the structure. Multiple technology selections may also be used, for example, disk and tape in the same virtual device structure. The ability to modify structure rules and the ability to adjust already stored data to the new rules is also provided.

A VDS may include a subsystem virtual device definition table which may consist of, for example, the following:

Virtual Definition 1:
Performance requirements:
  a) sustainable data transfer rate
  b) sustainable start input output (SIO) commands per second
  c) parallel SIO
Availability requirements
  a) time to first accessibility of data
  b) time to hold off new users for consistency checks
Reliability requirements
  a) allowed probability of data block loss
  b) allowed probability of data file loss
Capacity Management requirements
  a) maximum size of data unit The definition of Performance requirements, Availability requirements, Reliability requirements and Capacity Management requirements (PARC) for each data unit is available to the owning entity to interpret and to modify the entity. The owning entity may:

1) share access to the data definition with or without the data;
2) allow the data definition to be associated with the data;
3) allow the data definition to be distributed with the data; and
4) make a copy of the definition and have more than one definition for the same data unit, wherein
  a) the copy process may modify one or more of the extant definitions and expect the subsystem to make the necessary changes so that the data unit will comply with all definitions;
  b) the copy process may distribute data units or portions thereof with selected definitions; and
  c) the copy process may distribute data units or portions thereof with selected subsets of the full definition.

Storage performance, availability, reliability and capacity systems(PARCs) are dynamic subsystems that support flexible definitions of data storage requirements at the data level. The present invention is based on providing a subsystem level application program interface (API) that allows a user to request or imply a demand for the use of data storage capabilities. Such data storage capabilities may be defined by requesting capabilities associated with data units that may invoke the use of performance structures like, for example, striping, redundancy structures like mirroring and demand copies, and location or availability structures like, for example, remote location of copies or tape archives copies. These capabilities may also have scheduling and synchronizing information that may allow complete policies to be defined and associated with individual data units or sets of data units.

Therefore, the present invention anticipates future requirements by matching the definition associated with a data unit to a logical device definition with expanded capabilities, for example, using multiple sets of stripe groups to effect the availability of providing at a later date the performance of wider stripes than originally implied by the performance requested, using more layers or copies of redundancy data to later provide the ability to improve the reliability when specifications change and become higher than originally required, and actually making additional copies of the data on devices that employ different technologies possibly even in remote locations.

Figure 4:
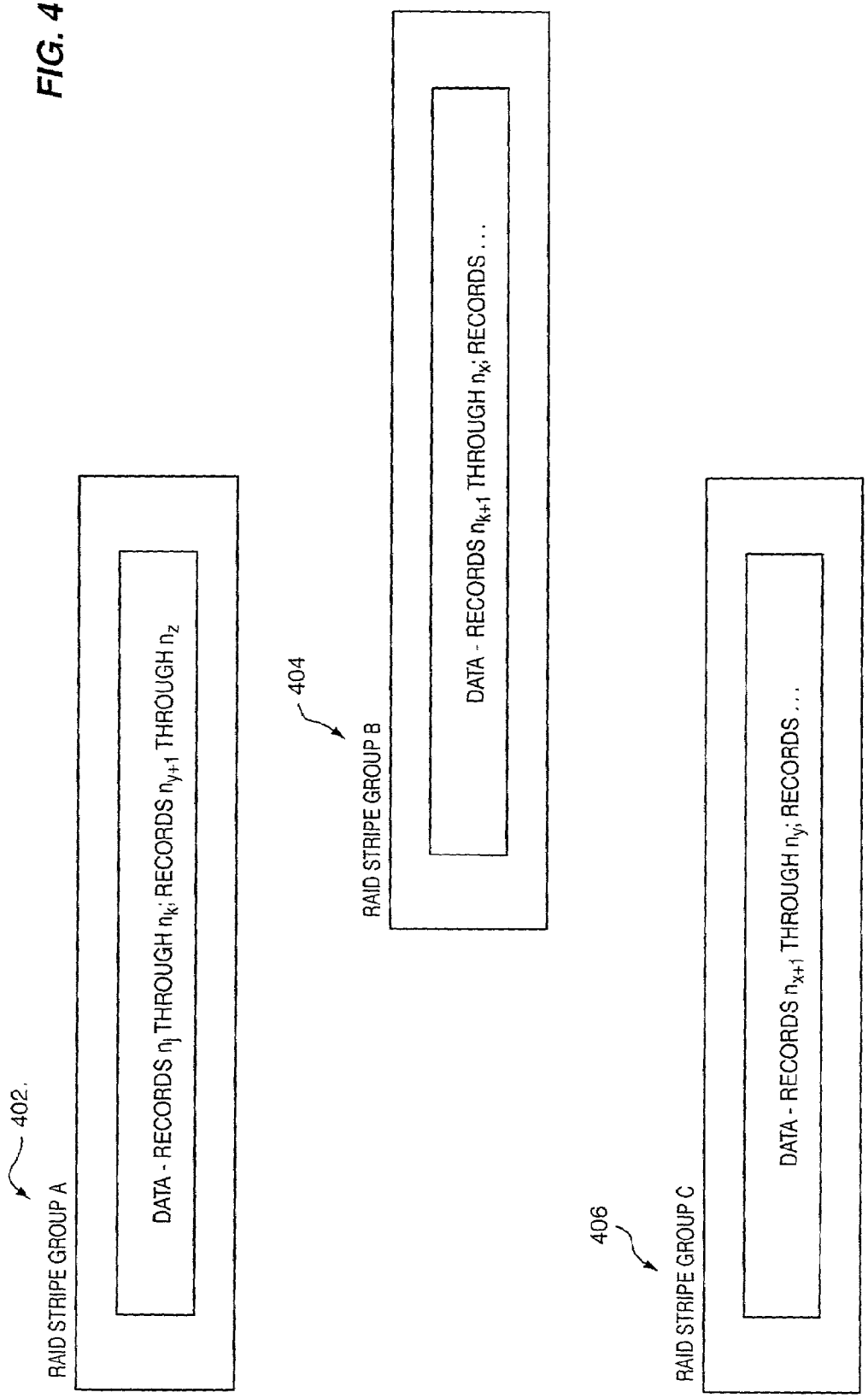
FIG. 4 is an illustration of the use of multiple RAID groups for providing potential for future higher performance requests in accordance with a preferred embodiment of the present invention.

FIG. 4 is an illustration of the use of multiple RAID groups for providing potential for future higher performance requests in accordance with a preferred embodiment of the present invention. FIG. 4 shows the use of multiple RAID groups where data may be read in parallel for records $n_j$ through $n_k$ from RAID stripe group A 402 and then records $n_{k+1}$ through $n_x$ may be read in parallel from RAID stripe group B 404 and then records $n_{x+1}$ through $n_y$ may be read in parallel from RAID stripe group C 406 and then cycling back to RAID stripe group A 402 for the next set of records $n_{y+1}$ through $n_z$. Later if performance requirements demand higher throughput records $n_j$ through $n_x$ may be read in parallel from RAID stripe group A 402 and RAID stripe group B 404 simultaneously or records $n_j$ through $n_y$ from RAID stripe group A 402, RAID stripe group B 404, and RAID stripe group C 406 simultaneously.

All RAID stripe groups may be read at once up to the point of anticipated performance requirements. If all RAID stripe groups are read at once, but the system does not meet a newly imposed performance requirement, then the data may be rewritten to a higher performance capability. The present invention also provides a facility for reviewing and modifying or adjusting the interpretation of "appropriate" data storage characteristics after the data element has already been stored. The specific way in which the host systems use the data will imply additional requirements initially not specified. These new requirements may be added to the overall specification and the implementation changed to accommodate the changes.

For example, the characteristics for a data unit may be historically maintained in a meta-data record associated with that data unit and may be updated as the use of the data is monitored. Updates may then trigger subsystem activity to modify the stored characteristics for the data unit. For example, the subsystem may note that a specific portion of the data is referenced in concert with another portion and as a consequence will set staging control metadata that will fetch the anticipated data when the companion data is accessed. In addition, a facility for accepting new specifications for data storage characteristics after the data unit has been stored is provided. The ability for modifying where and/or how an already stored data unit is managed is provided, including, but not limited to the subsystem actually changing where and/or how the associated data elements are stored. The modification of data element storage may be required to meet newly interpreted or specified data unit storage characteristics. When new requirements are imposed on a set of data units and the system has not anticipated the requirements, the present invention builds a new logical device definition from the specified or interpreted data storage characteristics.

Figure 5:
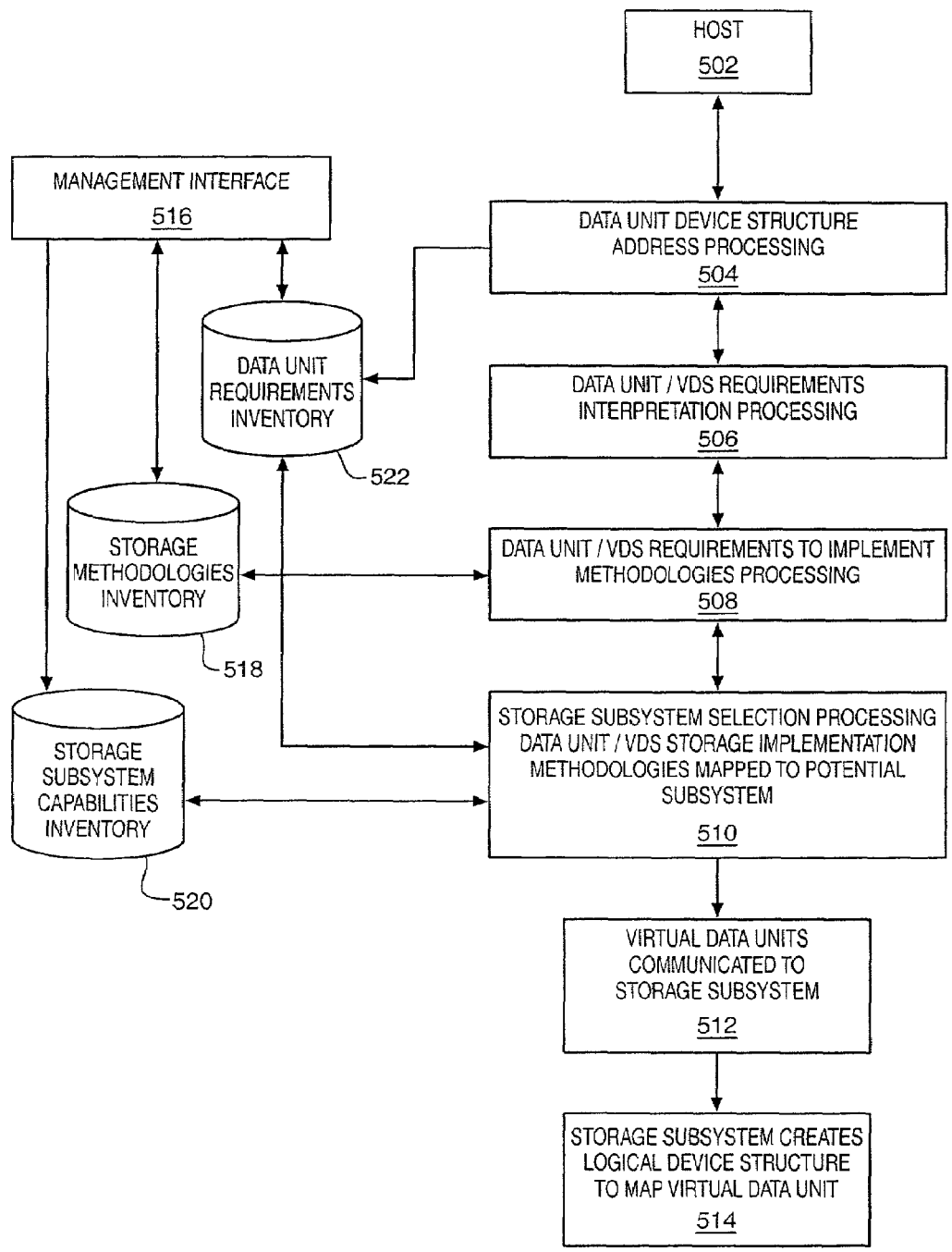
FIG. 5 is a flowchart illustrating a data unit/virtual device structure data processing methodology in accordance with a preferred embodiment of the present invention.

FIG. 5 is a flowchart illustrating a data unit/virtual device structure data processing methodology in accordance with a preferred embodiment of the present invention. A top down approach may be used by building towards characteristics of known physical device types. For a collection of data elements with a virtual data unit address understood by host system (step 502) the data unit virtual device structure address is processed (step 504). The assigned virtual address communicated to the subsystem may be the same as or different from the virtual data unit address that is known to the host system. The data unit/VDS requirements interpretation is processed (step 506), then the data units/VDS requirements are processed to map methodologies for implementation (step 508). Then the storage subsystem selection processing for the data unit/VDS identifies which storage implementation methodologies are mapped to which potential subsystems and selections for subsystem use are made (step 510). Virtual data units are then communicated to the storage subsystem or subsystems selected (step 512). Each storage subsystem creates a logical device structure to map the virtual data unit (step 514).

Management interface 516 may manage data unit requirements inventory 522, storage methodologies inventory 518 and receives and provides input from/to storage subsystem capabilities inventory 520. Data unit requirements inventory receives input from data unit virtual device structure address processing (step 504) and storage subsystem selection in processing data unit/VDS storage implementation methodologies when such methodologies are mapped to potential subsystems (step 510). Storage methodologies inventory 518 receives input from data and provides input to data units/VDS requirements to implement methodologies processing (step 508).

Figure 6:
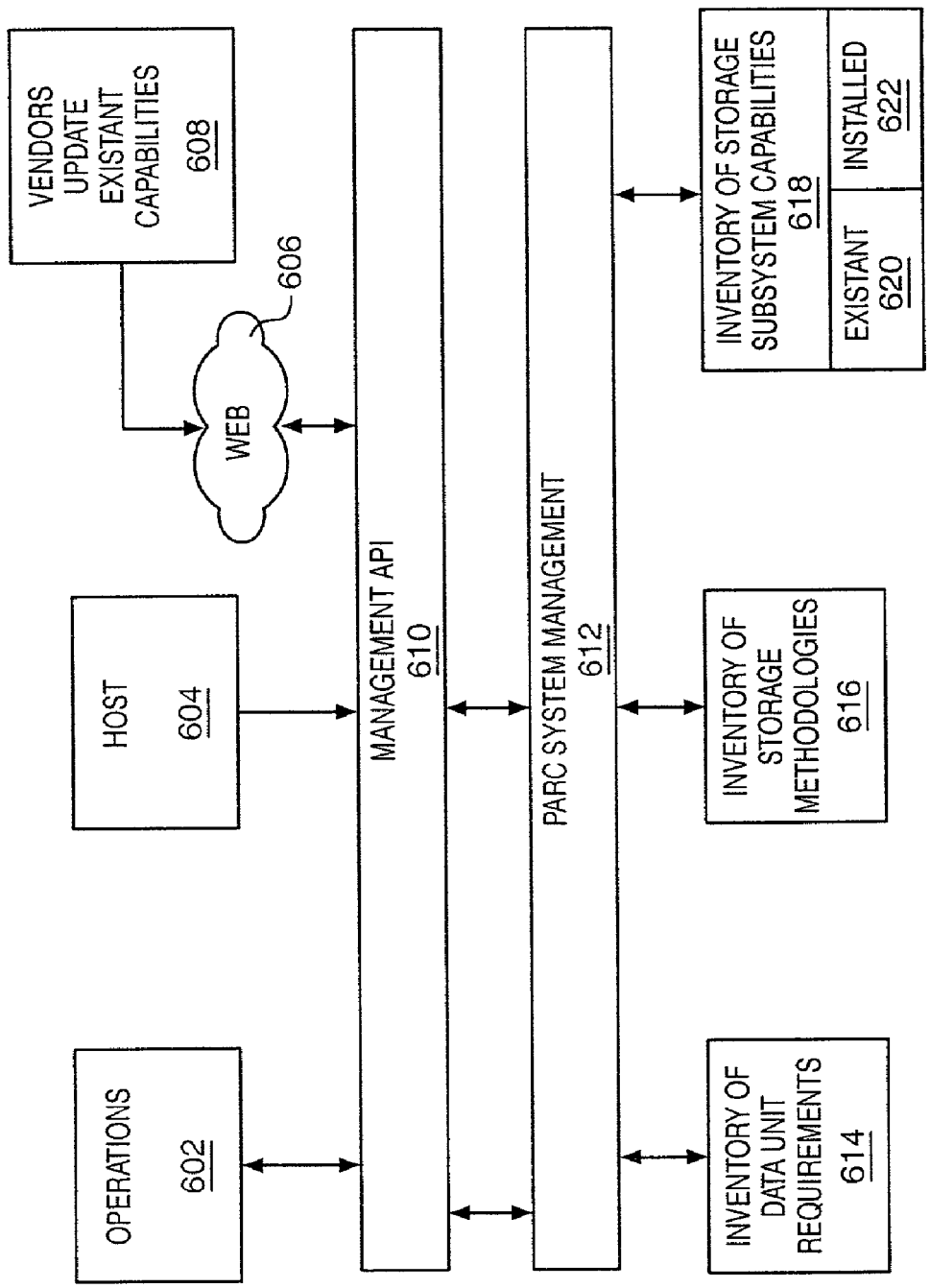
FIG. 6 is an exemplary block diagram of the management API branch illustrated in FIG. 5 in accordance with a preferred embodiment of the present invention.

FIG. 6 is an exemplary block diagram of the management API branch illustrated in FIG. 5 in accordance with a preferred embodiment of the present invention. In this example, Management API 610 may receive input from operations 602, host 604 or through vendors updating existent capabilities 608, which may be via a distributed data processing system, such as, for example, internet 606. PARC system management 612 provides input and provides output to/from management API 610. PARC system management 612 receives input from inventory of data unit requirements 614 along with inventory of storage methodologies 616 and inventory of storage subsystem capabilities 618. Inventory of storage subsystem capabilities may be made up of existent storage subsystem capabilities 620 and installed storage subsystem capabilities 622. If a data unit requirement or a storage methodology requires a particular storage subsystem capability, it needs to be determined as to whether the storage subsystem capability actually exists and, if so, whether the capability is actually installed on an available subsystem. If the storage subsystem capability is actually installed on an available subsystem, the required capability may be provided to satisfy data unit requirements 614 and/or implement a storage methodology 616. However, if the data unit requirement or the storage methodology finds no capability existent within the inventory of storage subsystem capabilities, the data unit requirement and/or the storage methodology may request updates to subsystem capabilities 618 by way of vendor update existent capabilities 608.

Furthermore, operations may be advised when existent capabilities provide a superior solution over that provided by the installed capabilities. Operations may also be informed when no solution is available utilizing the installed capabilities but may be made available via existent but not installed capabilities. Also, operations may be advised when no solution may be found for the stated requirements.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for creating a logical device based on reconciliation of virtual data unit requirements and storage unit capabilities, comprising the steps of:
   determining storage characteristic requirements for a virtual data unit by reading from an inventory of virtual data unit requirements;
   processing the storage characteristic requirements to map said storage characteristic requirements into storage implementation methodologies using a storage methodology inventory;
   identifying which storage implementation methodologies are mapped to potential subsystems or devices using management information that provides a storage unit capabilities inventory;
   communicating the virtual data unit to one or more of the available potential storage subsystems; and
   creating, in the storage subsystem, a logical device to map the virtual data unit, said storage characteristic requirements being maintained at a data management level instead of being maintained at a device management level.

2. The method of claim 1, wherein the management information is related to attributes of the storage unit capabilities utilizing a plurality of rules.

3. The method of claim 2, wherein the plurality of rules are variable.

4. The method of claim 3, wherein the variable rules are an algorithm.

5. The method of claim 1, wherein the management information is processed in accordance with storage element attributes and further comprises:
   deriving relationships that define a first and second boundaries; and
   stipulating the first and second boundaries, wherein stipulated first and second boundaries includes stated relationships from derived relationships.

6. The method of claim 5, wherein the relationships exist only on demand.

7. The method of claim 5, wherein the relationships are a combination of storage subsystem relationships.

8. The method of claim 7, wherein the combination of storage subsystem relationships includes a redundant array of inexpensive disks (RAID) and a hierarchical storage management (HSM).

9. The method of claim 1, wherein the storage characteristic requirements comprise performance requirements, availability requirements, reliability requirements and capacity requirements.

* * * * *